(12) United States Patent
Poniatowski et al.

(10) Patent No.: US 10,065,536 B2
(45) Date of Patent: Sep. 4, 2018

(54) RECLINING SEAT FOR A VEHICLE

(71) Applicants: Jeffrey J Poniatowski, Royal Oak, MI (US); Robert Elton, Ann Arbor, MI (US); Travis D Bechtel, Goodrich, MI (US); David M Gable, Clinton Township, MI (US); Joel T Hudson, Waterford, MI (US)

(72) Inventors: Jeffrey J Poniatowski, Royal Oak, MI (US); Robert Elton, Ann Arbor, MI (US); Travis D Bechtel, Goodrich, MI (US); David M Gable, Clinton Township, MI (US); Joel T Hudson, Waterford, MI (US)

(73) Assignee: FCA US LLC, Auburn Hills, MI (US)

( * ) Notice: Subject to any disclaimer, the term of this patent is extended or adjusted under 35 U.S.C. 154(b) by 168 days.

(21) Appl. No.: 15/272,709

(22) Filed: Sep. 22, 2016

(65) Prior Publication Data
US 2017/0088020 A1 Mar. 30, 2017

Related U.S. Application Data

(60) Provisional application No. 62/222,859, filed on Sep. 24, 2015.

(51) Int. Cl.
| | |
|---|---|
| *B60N 2/22* | (2006.01) |
| *B60N 2/08* | (2006.01) |
| *B60N 2/433* | (2006.01) |
| *B60N 2/90* | (2018.01) |

(52) U.S. Cl.
CPC ......... *B60N 2/2209* (2013.01); *B60N 2/0806* (2013.01); *B60N 2/0881* (2013.01); *B60N 2/433* (2013.01); *B60N 2/938* (2018.02)

(58) Field of Classification Search
CPC .. B60N 2/0806; B60N 2/0881; B60N 2/2209; B60N 2/433; B60N 2/938
See application file for complete search history.

(56) References Cited

U.S. PATENT DOCUMENTS 4,065,178 A * 12/1977 Carella ................. B60N 2/123 248/430
5,158,338 A * 10/1992 Hayakawa ......... B60N 2/01591 297/335
5,597,206 A * 1/1997 Ainsworth ........... B60N 2/0705 297/317

(Continued)

Primary Examiner — James M Ference
(74) Attorney, Agent, or Firm — Ralph E. Smith

(57) ABSTRACT

A vehicle seat includes a track latch assembly having a lower track configured to couple to a vehicle floor, an upper track coupled to a seat base, a recline handle rotatably coupled to a seat bottom, and a track release mechanism configured to move between a disengaged position that enables relative sliding movement between the lower track and the upper track, and an engaged position that facilitates preventing relative sliding movement between the lower track and the upper track. Rotation of the recline handle is configured to move the track release mechanism from the engaged position to the disengaged position, and movement of the seat bottom from a lowered position to a raised position is configured to move the track release mechanism from the engaged position to the disengaged position. A pivot latch assembly prevents movement of the seat bottom to and from the lowered and raised positions.

17 Claims, 7 Drawing Sheets

(56) References Cited

U.S. PATENT DOCUMENTS

| | | | | |
|---|---|---|---|---|
| 5,671,948 A * | 9/1997 | Susko | B60N 2/3047 | 280/801.1 |
| 5,702,145 A * | 12/1997 | Fowler | B60N 2/3013 | 296/65.05 |
| 5,711,505 A * | 1/1998 | Nennoto | B60N 2/01516 | 248/424 |
| 5,918,937 A * | 7/1999 | Moffa | B60N 2/3047 | 297/324 |
| 6,183,033 B1 * | 2/2001 | Arai | B60N 2/3013 | 296/65.09 |
| 6,196,613 B1 * | 3/2001 | Arai | B60N 2/3031 | 296/65.09 |
| 6,250,704 B1 * | 6/2001 | Garrido | B60N 2/06 | 296/65.03 |
| 6,371,556 B1 * | 4/2002 | Arai | B60N 2/3013 | 297/283.2 |
| 6,565,138 B2 * | 5/2003 | Sparrer | B60N 2/3011 | 296/63 |
| 6,655,738 B2 * | 12/2003 | Kammerer | B60N 2/0292 | 296/65.09 |
| 6,964,452 B2 * | 11/2005 | Kammerer | B60N 2/06 | 296/65.09 |
| 7,090,188 B2 * | 8/2006 | Severini | B60N 2/123 | 248/424 |
| 7,152,923 B2 * | 12/2006 | Charras | B60N 2/206 | 297/378.12 |
| 7,270,371 B2 | 9/2007 | Adragna | | |
| 7,350,867 B2 * | 4/2008 | Park | B60N 2/08 | 297/331 |
| 7,374,242 B2 | 5/2008 | Champ | | |
| 7,434,883 B2 * | 10/2008 | Deptolla | B60N 2/123 | 297/15 |
| 7,559,594 B2 * | 7/2009 | McMillen | B60N 2/206 | 296/65.09 |
| 7,568,764 B2 | 8/2009 | Harper | | |
| 7,611,200 B2 | 11/2009 | Jovicevic | | |
| 7,686,368 B2 * | 3/2010 | Ghergheli | B60N 2/0292 | 296/65.05 |
| 7,780,138 B1 * | 8/2010 | Lee | B60N 2/0705 | 248/429 |
| 8,376,442 B1 * | 2/2013 | Brantley | B60N 2/24 | 296/65.09 |
| 8,444,223 B2 * | 5/2013 | Moegling | B60N 2/3013 | 297/316 |
| 8,662,561 B2 | 3/2014 | Runde | | |
| 8,770,646 B2 * | 7/2014 | Line | B60N 2/0232 | 296/209 |
| 9,333,883 B2 * | 5/2016 | Abe | B60N 2/3013 | |
| 9,573,490 B1 | 2/2017 | Poniatowski | B60N 2/2245 | |
| 2003/0197410 A1 | 10/2003 | Blair | B60N 2/0705 | 297/378.12 |
| 2004/0090102 A1 * | 5/2004 | Tame | B60N 2/20 | 297/378.12 |
| 2004/0183328 A1 * | 9/2004 | Daniel | B60N 2/01541 | 296/65.03 |
| 2006/0214459 A1 * | 9/2006 | Kammerer | B60N 2/045 | 296/65.09 |
| 2007/0096497 A1 * | 5/2007 | Adragna | B60N 2/2209 | 296/65.16 |
| 2007/0252404 A1 | 11/2007 | Muck | | |
| 2008/0100112 A1 | 5/2008 | Hausler | | |
| 2009/0273211 A1 * | 11/2009 | Hancock | B60N 2/3011 | 297/13 |
| 2014/0265499 A1 | 9/2014 | Pacolt | | |
| 2015/0298582 A1 * | 10/2015 | Elton | B60N 2/045 | 297/340 |
| 2017/0088020 A1 * | 3/2017 | Poniatowski | B60N 2/938 | |

* cited by examiner

RECLINING SEAT FOR A VEHICLE

CROSS-REFERENCE TO RELATED APPLICATION

This application claims the benefit of U.S. Provisional Ser. No. 62/222,859, filed Sep. 24, 2015.

FIELD

The present application relates generally to passenger seating for a vehicle and, more particularly, to latching mechanisms for a reclining rear seat of a vehicle.

BACKGROUND

It is desirable to provide optimal passenger comfort for rear seat passengers in vehicles, including pickup trucks. However, increasing passenger comfort for rear seat passengers in pickup trucks has been challenging since the rear wall of the pickup truck cabin may inhibit an ability of the rear seat to recline. Some vehicle systems provide rear seats that are fixed in a forward position relative to the rear cabin wall to allow adequate room for the seat back to recline. This arrangement, however, typically reduces or prohibits satisfactory sliding adjustment of the seat as well as reduces an amount of cargo/passenger space that would otherwise be available in front of the seat. Accordingly, it is desirable to provide an improved adjustable rear seating system for a vehicle.

SUMMARY

In one exemplary aspect of the invention, a vehicle seat is provided. The vehicle seat includes a seat base, a seat bottom frame pivotally coupled to the seat base such that the seat bottom frame is movable between a lowered position and a raised position, a seat back pivotally coupled to the seat bottom frame, and a track latch assembly configured to facilitate selective sliding movement of the seat base relative to a vehicle floor. The track latch assembly includes a lower track configured to couple to the vehicle floor, an upper track coupled to the seat base, a recline handle rotatably coupled to the seat bottom frame, and a track release mechanism configured to move between a disengaged first position that enables relative sliding movement between the lower track and the upper track, and an engaged second position that facilitates preventing relative sliding movement between the lower track and the upper track. Rotation of the recline handle is configured to move the track release mechanism from the engaged second position to the disengaged first position, and movement of the seat bottom frame from the lowered position to the raised position is configured to move the track release mechanism from the engaged second position to the disengaged first position.

In addition to the foregoing, the described assembly may include one or more of the following features: a pivot latch assembly configured to facilitate selectively preventing movement of the seat bottom from the lowered position to the raised position, and from the raised position to the lowered position. The pivot latch assembly includes a pendulum catch coupled to the seat bottom frame, a pendulum support member fixed from rotation relative to the seat bottom frame and the pendulum catch, and an inertial pendulum coupled to the pendulum support member, wherein during a vehicle impact event the inertial pendulum is configured to engage the pendulum catch to facilitate preventing rotational movement of the seat bottom frame.

In another exemplary aspect of the invention, a vehicle seat is provided. The vehicle seat includes a seat base, a seat bottom frame pivotally coupled to the seat base such that the seat bottom frame is movable between a lowered position and a raised position, a seat back pivotally coupled to the seat bottom frame, a track latch assembly configured to facilitate selective sliding movement of the seat base relative to a vehicle floor, and a pivot latch assembly. The track latch assembly includes a lower track configured to couple to the vehicle floor, an upper track coupled to the seat base, a recline handle rotatably coupled to the seat bottom frame, and a track release mechanism configured to move between a disengaged first position that enables relative sliding movement between the lower track and the upper track, and an engaged second position that facilitates preventing relative sliding movement between the lower track and the upper track. Rotation of the recline handle is configured to move the track release mechanism from the engaged second position to the disengaged first position, and movement of the seat bottom frame from the lowered position to the raised position is configured to move the track release mechanism from the engaged second position to the disengaged first position. The pivot latch assembly is configured to facilitate selectively preventing movement of the seat bottom from the lowered position to the raised position, and from the raised position to the lowered position. The pivot latch assembly includes a pendulum catch coupled to the seat bottom frame, a pendulum support member fixed from rotation relative to the seat bottom frame and the pendulum catch, and an inertial pendulum coupled to the pendulum support member. During a vehicle impact event, the inertial pendulum is configured to engage the pendulum catch to facilitate preventing rotational movement of the seat bottom frame.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
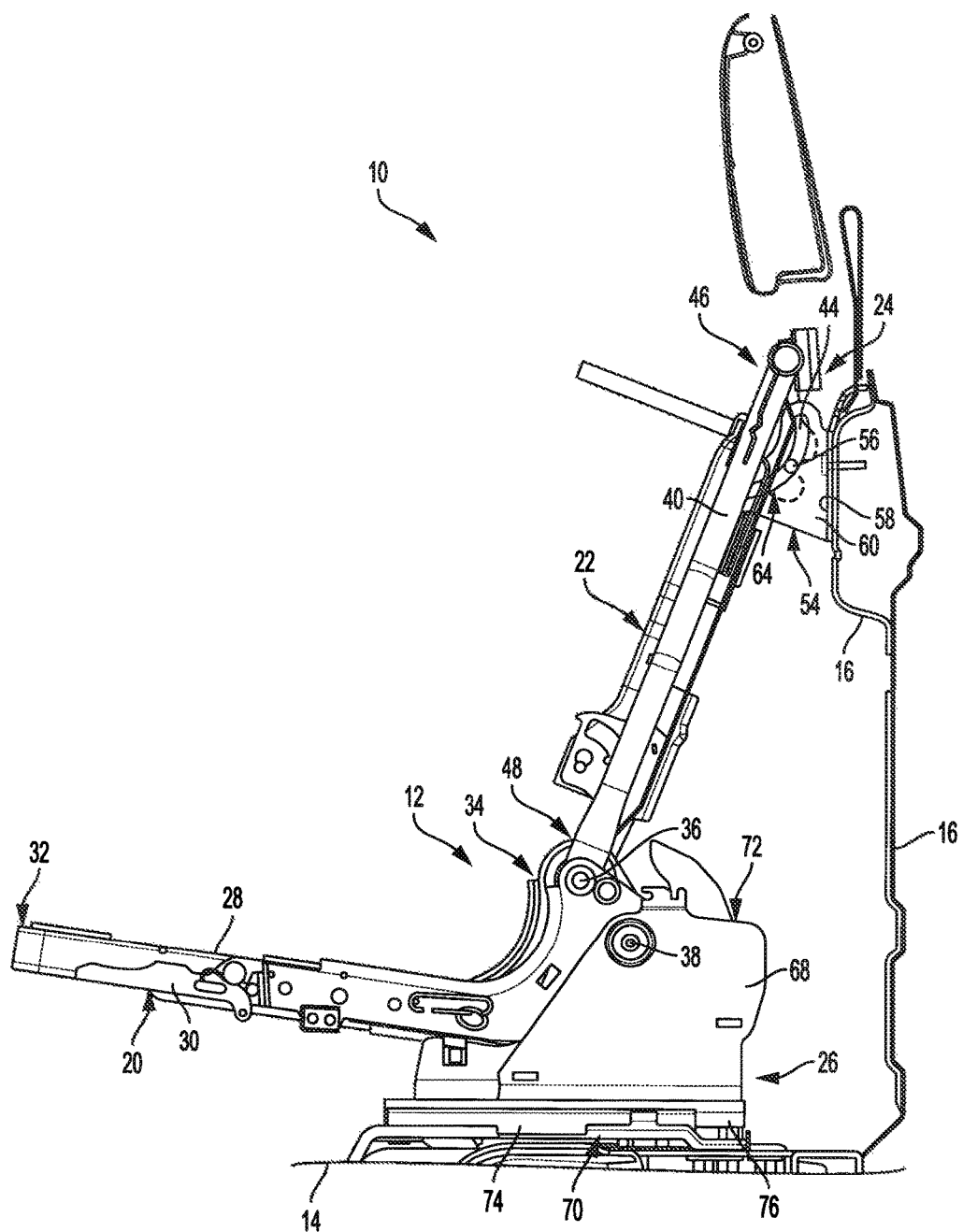
FIG. 1 is a side view of an exemplary vehicle seat system in a first position in accordance with the principles of the present disclosure.
Figure 2:
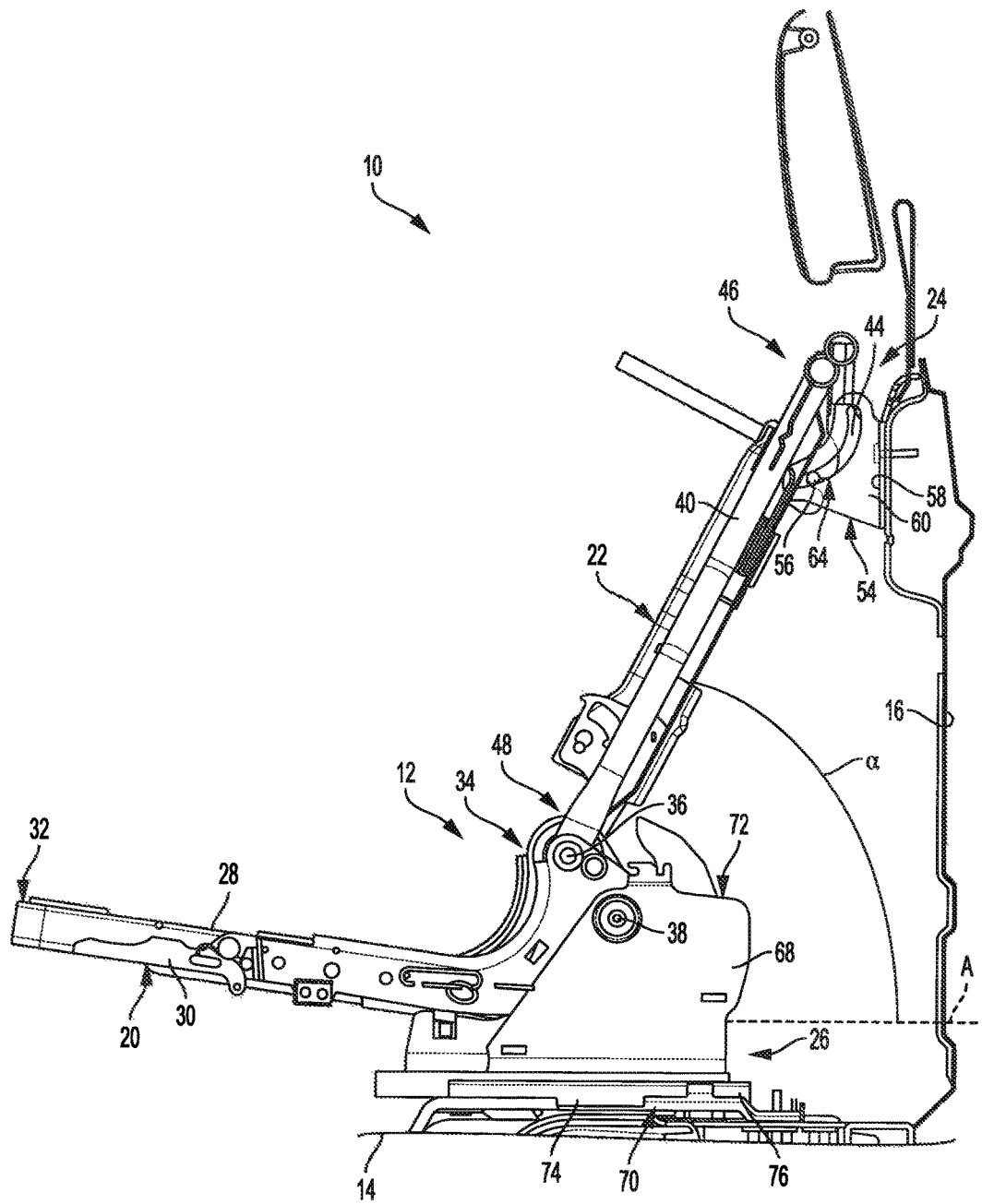
FIG. 2 is a side view of the vehicle seat system shown in FIG. 1 in a second position in accordance with the principles of the present disclosure.
Figure 3:
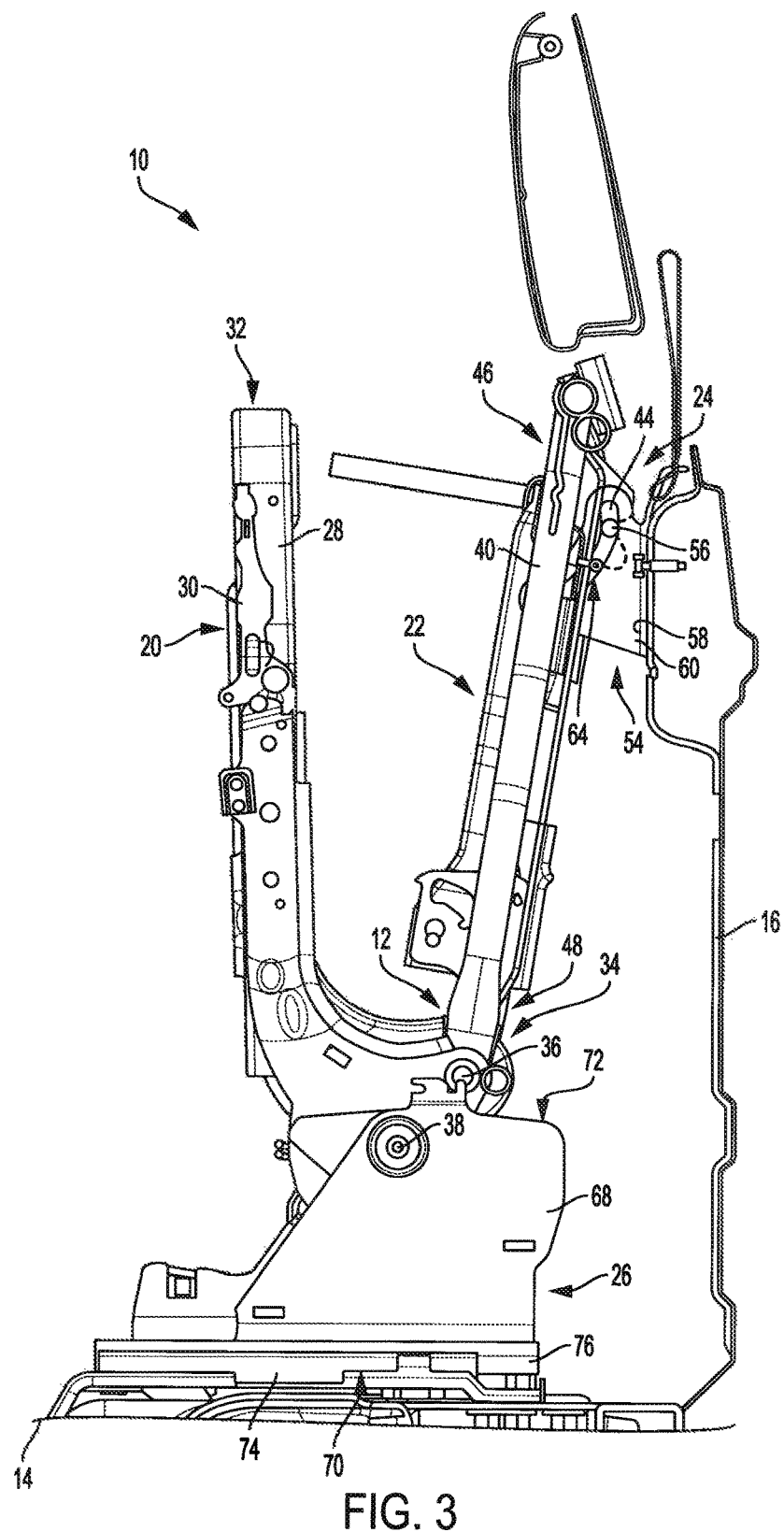
FIG. 3 is a side view of the vehicle seat system shown in FIG. 1 in a third position in accordance with the principles of the present disclosure.

With reference to FIGS. 1-3, an exemplary vehicle seat system 10 according to some embodiments of the present disclosure is illustrated. Vehicle seat system 10 includes a vehicle seat 12 coupled to a vehicle floor 14 and a vehicle rear wall 16. In an exemplary embodiment, vehicle seat system 10 is shown as rear seating of a pickup truck. However, vehicle seat system 10 may be used in various other vehicles with rear seating or other seating that is proximate a vehicle wall. Vehicle seat 12 is adjustable between a non-reclined, upright seating position (FIG. 1), a reclined position (FIG. 2), and a stowed position (FIG. 3), as is described herein in more detail.

In the exemplary embodiment, vehicle seat 12 generally includes a seat bottom 20, a seat back 22, a seat guide assembly 24, and a seat base adjustment assembly 26.

Seat bottom 20 includes a seat bottom frame 28 and a recline handle 30 rotatably coupled thereto. Seat bottom frame 28 includes a distal or forward end 32 and a proximal or rearward end 34, which is rotatably coupled to seat back 22 at a pivot joint 36. Seat bottom 20 is configured to rotate about a pivot point 38 between the seating position (FIG. 1) and the stowed position (FIG. 3). Seat bottom 20 is further configured to receive a seat bottom pad (e.g., foam) covered in upholstery (not shown) or the like.

Figure 4:
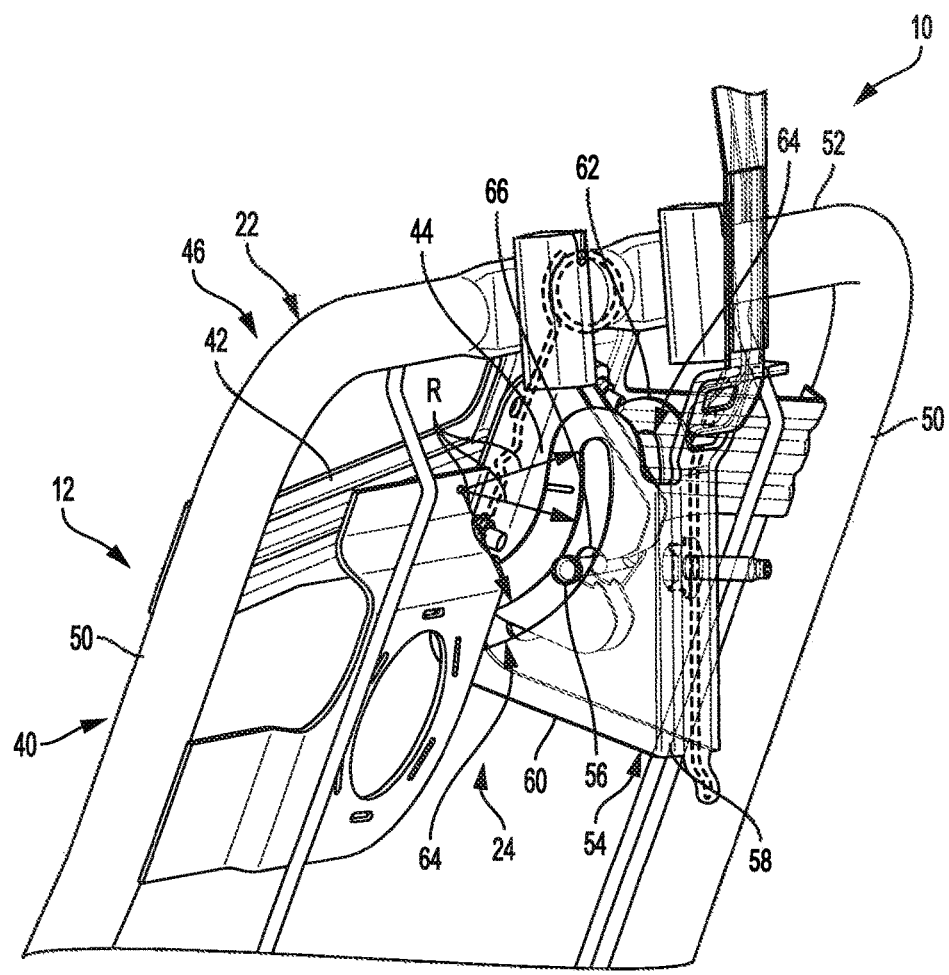
FIG. 4 is a perspective view of an exemplary seat guide assembly of the vehicle seat system shown in FIG. 1 in accordance with the principles of the present disclosure.
Figure 5:
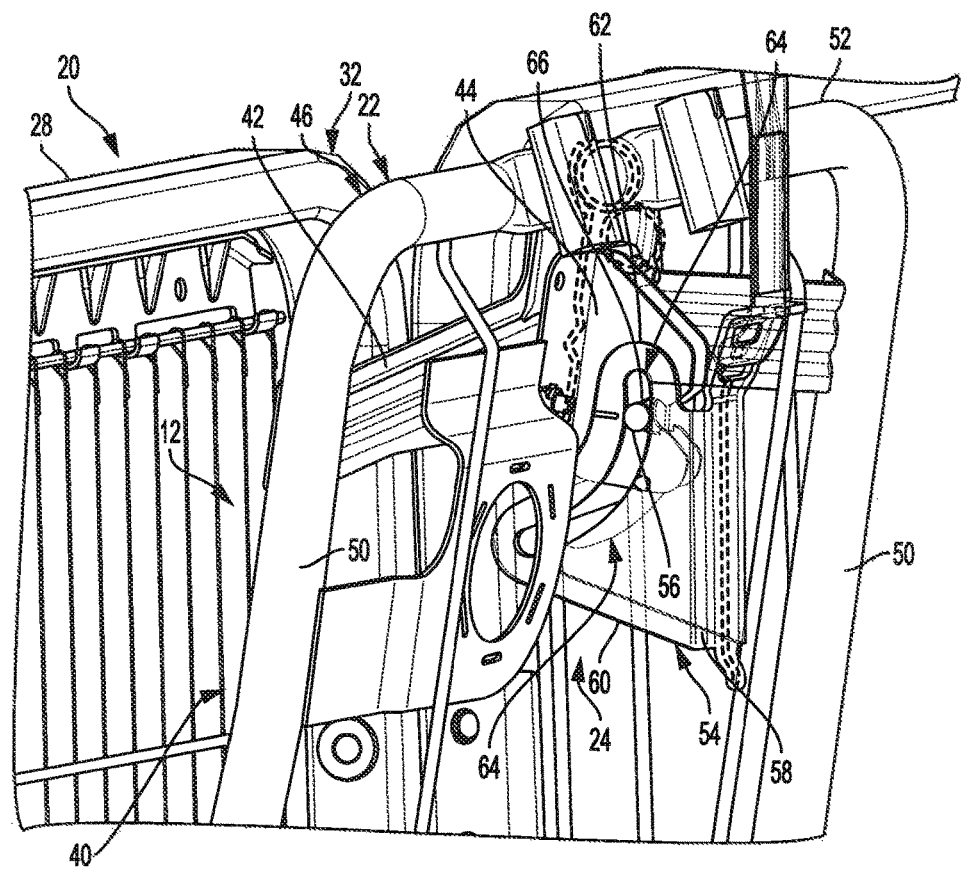
FIG. 5 is a perspective view of the seat guide assembly of the vehicle seat system shown in FIG. 2 in accordance with the principles of the present disclosure.
Figure 6:
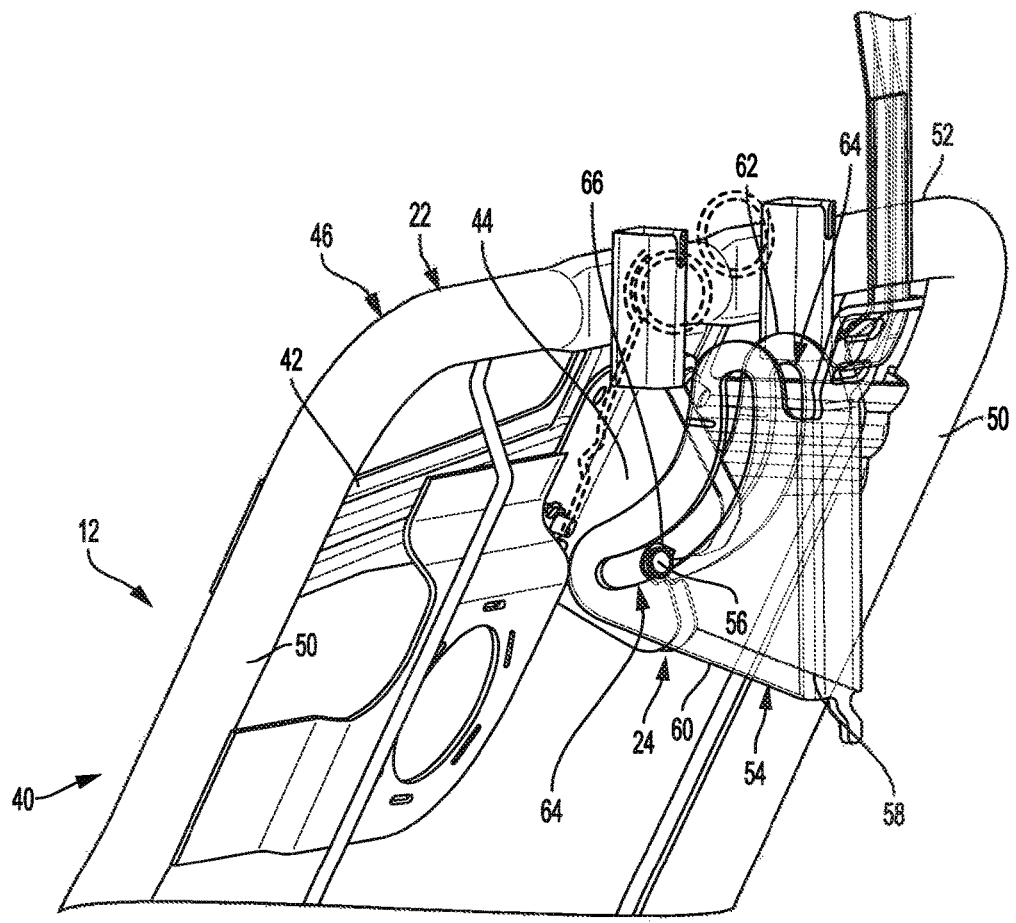
FIG. 6 is a perspective view of the seat guide assembly of the vehicle seat system shown in FIG. 3 in accordance with the principles of the present disclosure.

With additional reference to FIGS. 4-6, seat back 22 includes a seat back frame 40, a cross frame member 42, and a latch 44. Seat back frame 40 includes an upper end 46 and a lower end 48, which is rotatably coupled to seat bottom frame 28 at pivot joint 36. Seat back 22 is configured to receive a seat back pad (e.g., foam) covered in upholstery (not shown) or the like.

In the exemplary embodiment, seat back frame 40 includes longitudinal frame members 50 coupled by a lateral frame member 52. Cross frame member 42 is coupled to and extends between adjacent longitudinal frame members 50. Latch 44 is coupled to cross frame member 42 and is operably associated with seat guide assembly 24.

In the exemplary embodiment, seat guide assembly 24 generally includes a guide bracket 54 and a pin 56. As shown in transparent in FIGS. 4-6, guide bracket 54 includes a bracket base 58 and opposed flanges 60, 62 extending therefrom. Bracket base 58 is configured to couple to vehicle rear wall 16, and each of flanges 60, 62 includes a curved slot 64, which receives pin 56 therein. Flanges 60, 62 are laterally spaced apart (cross-car) to provide increased stability to seat back 22 as it moves between the various positions.

As shown, latch 44 includes a pin receiving slot 66 configured to receive pin 56 such that latch 44 is at least partially disposed between opposed flanges 60, 62 to establish an adjustable connection between seat back frame 40 and seat guide assembly 24. Further, as shown, curved slot 64 has a constant or substantially constant radius 'R' (FIG. 4), thereby enabling a smooth and steady path of travel for pin 56.

As illustrated in FIGS. 4-6, pin 56 is operable to travel along curved slots 64 to adjust the position of seat back 22 relative to vehicle rear wall 16. Seat back 22 is adjustable between the seating position (FIG. 4) where pin 56 is positioned at the midpoint or generally at the midpoint of curved slots 64, the reclined position (FIG. 5) where pin 56 is positioned at the bottom or generally at the bottom of curved slots 64, and the stowed position (FIG. 6) where pin 56 is positioned at the top or generally at the top of curved slots 64.

Accordingly, as pin 56 travels along curved slots 64, a recline angle 'a' of seat back frame 40 is adjusted relative to a horizontal plane 'A'. Seat back frame 40 may be positioned at various angles 'a' as pin 56 travels along slots 64. In some embodiments, a predetermined number of locking positions for pin 56 and thus seat 12 may be defined. For example, seat guide assembly 24 may have four locking positions between the seating position and recline position. As such, sliding movement of seat bottom 20 and/or seat base 68 facilitates reclining movement of seat back 22 in a predetermined path spaced apart from and relative to rear wall 16 via seat guide assembly 24.

Figure 7:
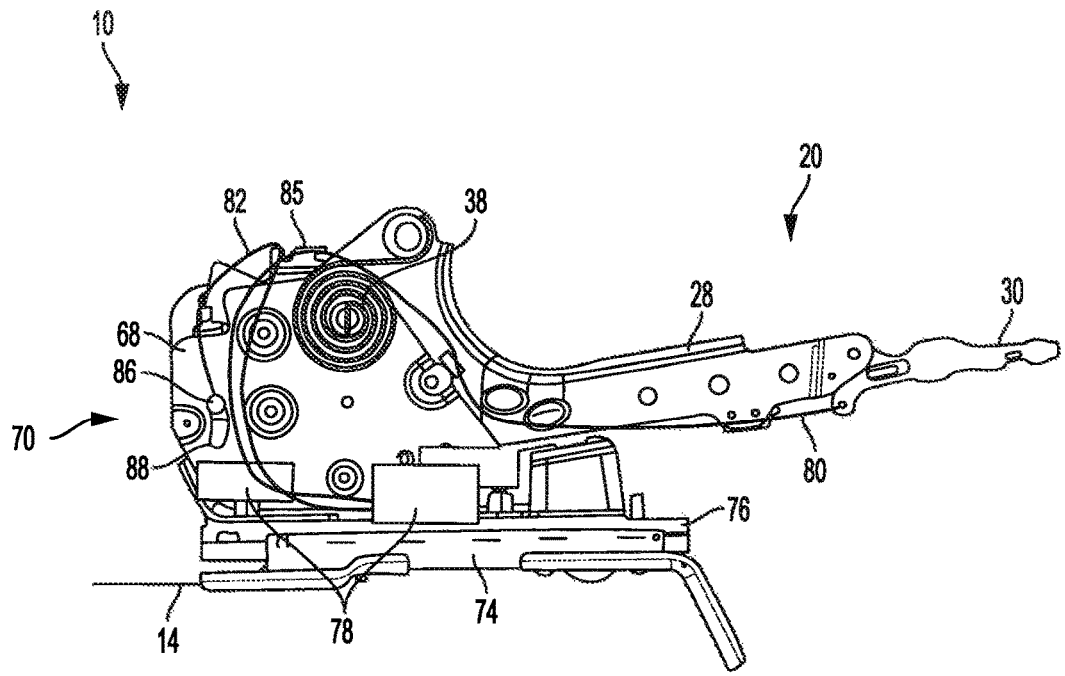
FIG. 7 is a side view of an exemplary track release assembly of the vehicle seat system shown in FIGS. 1-3 in accordance with the principles of the present disclosure.
Figure 8:
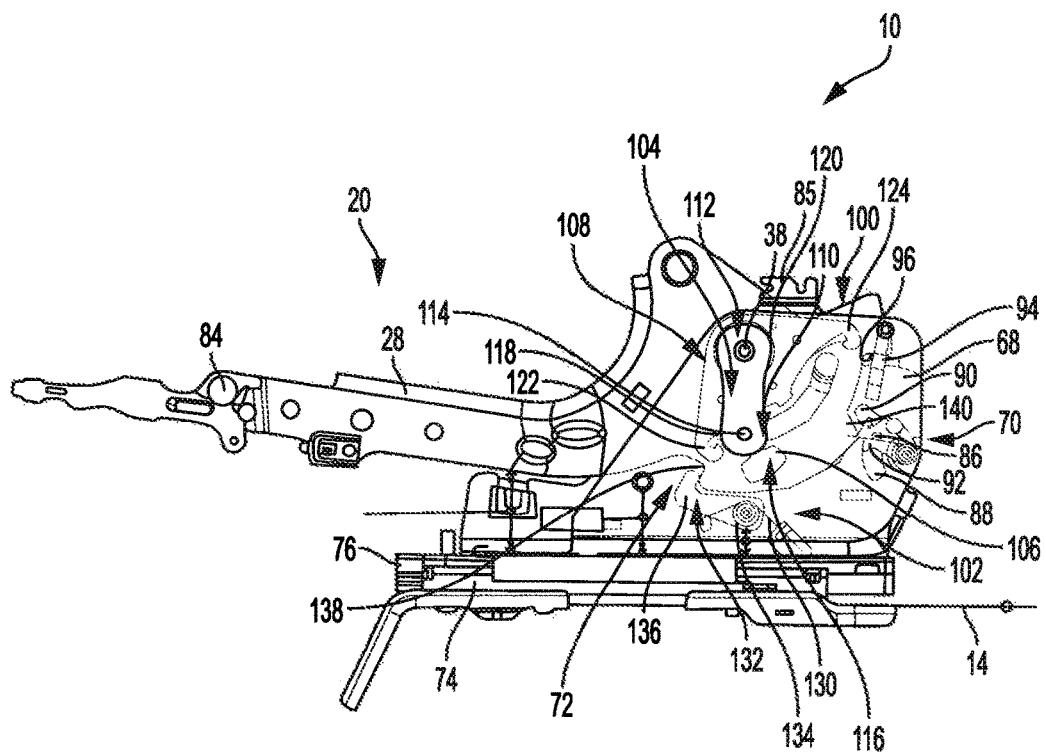
FIG. 8 is a side view of an exemplary pivot latch assembly of the vehicle seat system shown in FIGS. 1-3 in accordance with the principles of the present disclosure.

With reference to FIGS. 7 and 8, seat base adjustment assembly 26 is configured to facilitate movement of vehicle seat 12 between the seating position, the reclined position, and the stowed position. Seat base adjustment assembly 26 generally includes a seat base 68, a track latch assembly 70, and a pivot latch assembly 72.

In the exemplary embodiment, as illustrated in FIG. 7, track latch assembly 70 includes a lower track 74, an upper track 76, and a track release mechanism 78. Lower track 74 is coupled to vehicle floor 14, and upper track 76 is coupled to base 68. Upper track 76 is operably associated with lower track 74 such that base 68 and thus vehicle seat 12 is movable or slidable in the fore and aft directions. Thus, vehicle seat 12 does not have pivoting front or rear legs or links that are common in some seating systems, thereby reducing weight and complexity of seat 12. In the example embodiment, track latch assembly 70 includes two sets of tracks 74, 76 on either side of seat 12. However, track latch assembly 70 may have any suitable number of sets of tracks.

Track release mechanism 78 is operably associated with each set of tracks 74, 76 and is configured to move between a disengaged first position where mechanism 78 enables relative sliding movement between lower track 74 and upper track 76, and an engaged second position where mechanism 78 facilitates preventing relative sliding movement between lower track 74 and upper track 76. In example embodiment, track release mechanism 78 includes two separate components, each component engaging/disengaging one set of tracks 74, 76. In other embodiments, track release mechanism 78 may be a single component engaging/disengaging both sets of tracks 74, 76.

Track latch assembly 70 further includes a first cable 80 and a second cable 82. In some embodiments, track latch assembly 70 includes a splitter (not shown) that splits each cable 80, 82 into two cables that are each directed to one track release mechanism 78 operably associated with one of the two sets of tracks 74, 76.

First cable 80 is coupled between recline handle 30 and track release mechanism 78 and is configured to release or disengage track release mechanism 78 when recline handle 30 is rotated about a pivot point 84 (see FIG. 8). For example, with reference to FIG. 7, first cable 80 is operably associated with or coupled to a cable guide 85. As recline handle 30 is rotated about pivot point 84 in a counter clockwise direction, first cable 80 is pulled through cable guide 85 and activates mechanism 78.

Second cable 82 is coupled between a pin 86 and track release mechanism 78 and is configured to release or disengage track release mechanism 78 when seat bottom 20 is rotated about pivot point 38 toward rear wall 16 to the stowed position. As shown in FIGS. 7 and 8, pin 86 extends into and is configured to travel along a track or slot 88 formed in seat base 68. As shown in FIG. 8, pin 86 is coupled to a first lever 90, which is biased in the upward or backward position by a second lever 92 biased in the upward direction and coupled to a biasing mechanism 94 (e.g., a spring). As seat bottom 20 is rotated to the stowed position, seat bottom frame 28 rotates and a shoulder 96 thereof engages and causes downward movement of first lever 90 and second lever 92. This movement causes pin 86 to move downward in slot 88, which pulls second cable 82 through cable guide 85 and activates mechanism 78. Further, a biasing mechanism (not shown) may pull seat base 68 rearward once mechanism 78 disengages tracks 74, 76.

In the exemplary embodiment, as illustrated in FIG. 8, pivot latch assembly 72 includes an inertial latch system 100 and a friction detent system 102. Inertial latch system 100 is configured to prevent rotation of seat bottom 20 about pivot point 38 during a vehicle impact event, and friction detent system 102 is configured to hold seat bottom 20 in a lowered position (seating and recline positions) or a raised position (stowed position).

In the exemplary embodiment, inertial latch system 100 generally includes a pendulum support member 104, an inertial pendulum 106, and a pendulum catch 108. Pendulum support member 104 includes a first end 110 and a second end 112, which is coupled to seat base 68 such that pendulum support member 104 is fixed from rotation. Inertial pendulum 106 is rotatably coupled to support member first end 110 and is configured to rotate about a pivot point 114. Inertial pendulum 106 includes a first end 116 and a second end 118, which is configured to selectively engage pendulum catch 108.

Pendulum catch 108 includes a main body portion 120, a first hook portion 122, and a second hook portion 124. Main body portion 120 is coupled to seat bottom frame 28 such that pendulum catch 108 rotates with seat bottom frame 28 between the lowered position (see FIG. 8) and the raised position (FIG. 3). As such, first hook portion 122 is positioned proximate inertial pendulum 106 when seat bottom 20 is in the lowered position. In this position, during a vehicle rear impact event, inertial pendulum 106 is rotated counter clockwise (as shown in FIG. 8) about pivot point 114 such that pendulum second end 118 swings into and engages first hook portion 122. Accordingly, upward movement of seat bottom 20 is prevented by the engagement between inertial pendulum 106 and pendulum catch 108.

In contrast, second hook portion 124 is positioned proximate inertial pendulum 106 when seat bottom 20 is in the raised position (e.g., FIG. 3). In this position, during a vehicle front impact event, inertial pendulum 106 is rotated clockwise (as shown in FIG. 8) about pivot point 114 such that pendulum second end 118 swings into and engages second hook portion 124. Accordingly, downward movement of seat bottom 20 is prevented by the engagement between inertial pendulum 106 and pendulum catch 108.

In the exemplary embodiment, friction detent system 102 includes a biasing mechanism 130 (e.g., a spring) and a friction detent member 132 that includes a first end 134 and a second end 136. First end 134 is pivotally coupled to seat base 68, and second end 136 includes a hook-like portion configured to selectively engage a first detent shoulder 138 and a second detent shoulder 140 of seat bottom frame 28.

Biasing mechanism 130 is configured to bias friction detent member first end 132 into frictional engagement with first detent shoulder 138 when seat bottom 20 is in the lowered position shown in FIG. 8. As such, seat bottom 20 is prevented from rotating upward toward vehicle rear wall 16 until the force of biasing mechanism 130 is overcome, such as when a passenger pulls up on seat bottom 20.

Biasing mechanism 130 is configured to bias friction detent member second end 136 into frictional engagement with second detent shoulder 140 when seat bottom 20 is in the raised position shown in FIG. 3. As such, seat bottom 20 is prevented from rotating downward toward vehicle floor 14 until the force of biasing mechanism 130 is overcome, such as when a passenger pulls down and/or forward on seat bottom 20.

In operation, vehicle seat 12 may be moved from the seating position (FIG. 1) to the reclined position (FIG. 2) when a passenger engages recline handle 30, for example by pulling upward thereon. Manipulation of handle 30 causes track latch assembly 70, which was previously in the engaged position, to disengage thereby enabling sliding movement of seat base 68 and seat bottom 20 toward the front of the vehicle (i.e., toward the left in FIG. 1). Specifically, manipulation of handle 30 pulls first cable 80, which activates track release mechanism 78 to enable the sliding movement.

As seat bottom 20 and seat base 68 shift forward, seat back 22 is pulled downward and forward by virtue of its connection to seat bottom 20 at pivot joint 36. This movement is directed and controlled by the connection between latch 44 and pin 56 as pin 56 travels along curved slots 64, which facilitates a smooth, steady, and pleasing recline of vehicle seat 12. As such, the passenger can orient seat back 22 at multitudes of desired recline angles 'α' anywhere along the curved slot 64. When seat back 22 is positioned at the desired recline angle 'α', the passenger may then release recline handle 30, thereby causing track latch assembly 70 to engage and prevent sliding movement of seat base 68 and seat bottom 20.

Movement of vehicle seat 12 from the seating position (FIG. 1) to the stowed position (FIG. 3) may be initiated by a passenger applying a lifting force to seat bottom 20. Rotational movement of seat bottom 20 about pivot point 38 causes track latch assembly 70, which was previously in the engaged position, to disengage thereby enabling sliding movement of seat base 68 toward the rear of the vehicle (i.e., toward the right in FIG. 1). Specifically, movement of seat bottom 20 toward rear wall 16 causes bottom frame shoulder 96 to contact first lever 90, which moves the lever with pin 86 in a downward direction. This downward movement of pin 86 pulls second cable 82, which activates track release mechanism 78 to enable the sliding movement. In one embodiment, seat 12 may include biasing mechanism such as a spring (not shown) to pull seat base 68 rearward to ensure that seat 12 moves to the furthest rearward position on tracks 74, 76 before they re-lock.

As seat base 68 shifts rearward and seat bottom 20 rotates toward (or against) seat back 22, seat back 22 is pushed upward and seat back lower end 48 is moved rearward toward vehicle rear wall 16. This movement is directed and controlled by the connection between latch 44 and pin 56 as pin 56 travels along curved slots 64, which facilitates a smooth, steady, and pleasing stowing of vehicle seat 12. When seat bottom 20 and/or seat back 22 are in the desired position (e.g., the stowed position), track latch assembly 70 may be automatically engaged or engaged by the passenger to facilitate preventing sliding movement of seat base 68. In this position, pivot latch assembly 72 may be configured to facilitate preventing rotational movement of seat bottom 20 back down toward vehicle floor 14. Moreover, vehicle seat 12 may be moved from the reclined position (FIG. 2) to the stowed position (FIG. 3) in a manner similar to the movement described from the seating position to the stowed position.

Described herein are systems and methods for providing a reclining seat for a vehicle. The systems include a seat back coupled to a vehicle rear wall through a latch and seat guide assembly. The seat guide assembly includes a bracket having curved slots of a substantially constant radius to receive a pin operably associated with the latch. The system includes a seat bottom coupled to the seat back, and as the seat bottom is slidingly adjusted along the vehicle floor, the seat back is moved to various positions such as reclining and stowed positions. The latch and seat guide assembly enable the vehicle seat to be quickly and easily installed into the vehicle and facilitate providing smooth and steady movement of the vehicle seat between seated, reclined, and stowed positions.

Moreover, the systems include a track latch assembly and a pivot latch assembly. The track latch assembly includes two cable systems that are selectively and respectively engaged by recline and stow movement of the seat bottom. The track latch assembly is configured to selectively enable sliding movement of the vehicle seat when the cable systems are activated. The pivot latch assembly includes an inertial latch system and a friction detent system. The inertial latch system includes an inertial pendulum and catch to facilitate preventing rotational movement of seat bottom in vehicle impact events. The friction detent system is configured to facilitate securing seat bottom in lowered and raised positions until overcome by a predetermined force. Accordingly, the track latch assembly and pivot latch assembly provide increased management and control of vehicle seat movement.

It will be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A vehicle seat comprising:
   a seat base;
   a seat bottom frame pivotally coupled to the seat base such that the seat bottom frame is movable between a lowered position and a raised position;
   a seat back pivotally coupled to the seat bottom frame; and
   a track latch assembly configured to facilitate selective sliding movement of the seat base relative to a vehicle floor, comprising:
      a lower track configured to couple to the vehicle floor;
      an upper track coupled to the seat base;
      a recline handle rotatably coupled to the seat bottom frame; and
   a track release mechanism configured to move between a disengaged position that enables relative sliding movement between the lower track and the upper track, and an engaged position that facilitates preventing relative sliding movement between the lower track and the upper track,
      wherein rotation of the recline handle is configured to move the track release mechanism from the engaged position to the disengaged position, and
      wherein movement of the seat bottom frame from the lowered position to the raised position is configured to move the track release mechanism from the engaged position to the disengaged position.

2. The vehicle seat of claim 1, further comprising:
   a pivot latch assembly configured to facilitate selectively preventing movement of the seat bottom from the lowered position to the raised position, and from the raised position to the lowered position, the pivot latch assembly comprising:
      a pendulum catch coupled to the seat bottom frame;
      a pendulum support member fixed from rotation relative to the seat bottom frame and the pendulum catch; and
      an inertial pendulum coupled to the pendulum support member, wherein during a vehicle impact event the inertial pendulum is configured to engage the pendulum catch to facilitate preventing rotational movement of the seat bottom frame.

3. The vehicle seat of claim 2, wherein the pendulum catch comprises a main body portion, a first hook portion, and a second hook portion.

4. The vehicle seat of claim 3, wherein when the seat bottom frame is in the lowered position, the inertial pendulum is oriented proximate the first hook portion and is configured to engage the first hook portion to facilitate preventing rotational movement of the seat bottom frame to the raised position, and
   wherein when the seat bottom frame is in the raised position, the inertial pendulum is oriented proximate the second hook portion and is configured to engage the second hook portion to facilitate preventing rotational movement of the seat bottom frame to the lowered position.

5. The vehicle seat of claim 2, wherein the pendulum catch is coupled to the seat bottom frame such that the pendulum catch rotates with the seat bottom frame.

6. The vehicle seat of claim 1, wherein the track latch assembly further comprises:
   a lever;
   a pin coupled to the lever; and
   a cable coupled between the pin and the track release mechanism, wherein movement of the seat bottom frame from the lowered position to the raised position causes a portion of the seat bottom frame to engage and move the lever and pin to cause movement of the cable.

7. The vehicle seat of claim 6, wherein the lever comprises a first lever and a second lever rotatably coupled to the seat base, the pin coupled to at least one of the first and second levers.

8. The vehicle seat of claim 6, wherein the pin extends into a slot formed in the seat base, the pin configured to travel along the slot.

9. The vehicle seat of claim 1, further comprising a cable coupled between the recline handle and the track release mechanism.

10. A vehicle seat comprising:
    a seat base;
    a seat bottom frame pivotally coupled to the seat base such that the seat bottom frame is movable between a lowered position and a raised position;
    a seat back pivotally coupled to the seat bottom frame; and a track latch assembly configured to facilitate selective sliding movement of the seat base relative to a vehicle floor, comprising:
a lower track configured to couple to the vehicle floor;
an upper track coupled to the seat base;
a recline handle rotatably coupled to the seat bottom frame; and
a track release mechanism configured to move between a disengaged position that enables relative sliding movement between the lower track and the upper track, and an engaged position that facilitates preventing relative sliding movement between the lower track and the upper track,
a pivot latch assembly configured to facilitate selectively preventing movement of the seat bottom from the lowered position to the raised position, and from the raised position to the lowered position, comprising:
a pendulum catch coupled to the seat bottom frame;
a pendulum support member fixed from rotation relative to the seat bottom frame and the pendulum catch; and
an inertial pendulum coupled to the pendulum support member, wherein during vehicle impact event the inertial pendulum is configured to engage the pendulum catch to facilitate preventing rotational movement of the seat bottom frame;
wherein rotation of the recline handle is configured to move the track release mechanism from the engaged position to the disengaged position, and wherein movement of the seat bottom frame from the lowered position to the raised position is configured to move the track release mechanism from the engaged position to the disengaged position.

11. The vehicle seat of claim 10, wherein the pendulum catch comprises a main body portion, a first hook portion, and a second hook portion.

12. The vehicle seat of claim 11, wherein when the seat bottom frame is in the lowered position, the inertial pendulum is oriented proximate the first hook portion and is configured to engage the first hook portion to facilitate preventing rotational movement of the seat bottom frame to the raised position, and
wherein when the seat bottom frame is in the raised position, the inertial pendulum is oriented proximate the second hook portion and is configured to engage the second hook portion to facilitate preventing rotational movement of the seat bottom frame to the lowered position.

13. The vehicle seat of claim 10, wherein the pendulum catch is coupled to the seat bottom frame such that the pendulum catch rotates with the seat bottom frame.

14. The vehicle seat of claim 10, wherein the track latch assembly further comprises:
a lever;
a pin coupled to the lever; and
a cable coupled between the pin and the track release mechanism, wherein movement of the seat bottom frame from the lowered position to the raised position causes a portion of the seat bottom frame to engage and move the lever and pin to cause movement of the cable.

15. The vehicle seat of claim 14, wherein the lever comprises a first lever and a second lever rotatably coupled to the seat base, the pin coupled to at least one of the first and second levers.

16. The vehicle seat of claim 14, wherein the pin extends into a slot formed in the seat base, the pin configured to travel along the slot.

17. The vehicle seat of claim 10, further comprising a cable coupled between the recline handle and the track release mechanism.

* * * * *